(12) United States Patent
Oba

(10) Patent No.: US 10,780,744 B2
(45) Date of Patent: Sep. 22, 2020

(54) MOTORCYCLE PNEUMATIC TIRE

(71) Applicant: BRIDGESTONE CORPORATION, Tokyo (JP)

(72) Inventor: Hirofumi Oba, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 344 days.

(21) Appl. No.: 15/739,943

(22) PCT Filed: Jul. 5, 2016

(86) PCT No.: PCT/JP2016/003208
§ 371 (c)(1),
(2) Date: Dec. 26, 2017

(87) PCT Pub. No.: WO2017/010061
PCT Pub. Date: Jan. 19, 2017

(65) Prior Publication Data
US 2018/0194172 A1 Jul. 12, 2018

(30) Foreign Application Priority Data

Jul. 15, 2015 (JP) ................................. 2015-141464
Mar. 22, 2016 (JP) ................................. 2016-057513

(51) Int. Cl.
*B60C 11/11* (2006.01)
*B60C 11/03* (2006.01)

(52) U.S. Cl.
CPC ............... *B60C 11/11* (2013.01); *B60C 11/03* (2013.01); *B60C 11/0306* (2013.01);
(Continued)

(58) Field of Classification Search
CPC ............ B60C 2200/10; B60C 2200/14; B60C 11/0306; B60C 11/11
See application file for complete search history.

(56) References Cited

U.S. PATENT DOCUMENTS 5,088,535 A 2/1992 Potts et al.
5,318,086 A 6/1994 Narumi et al.
(Continued)

FOREIGN PATENT DOCUMENTS

CN 1655956 A 8/2005
CN 100513207 C 7/2009
(Continued)

OTHER PUBLICATIONS

Communication dated Feb. 25, 2019, from State intellectual Property Office of the P.R.C in counterpart application No. 201680041143.4.

(Continued)

*Primary Examiner* — Timothy Kennedy
*Assistant Examiner* — Alexander A Wang
(74) *Attorney, Agent, or Firm* — Sughrue Mion, PLLC

(57) ABSTRACT

Disclosed is a motorcycle pneumatic tire comprising a plurality of blocks arranged on a tread surface, wherein: a plurality of wide blocks, each having a tire widthwise length larger than a tire circumferential length, are formed in at least a central region and intermediate regions, and a plurality of narrow blocks, each having a smaller tire widthwise length than each of the wide blocks, are formed in at least the intermediate regions; and the following relations are satisfied: $1.5 \leq W1/L1 \leq 4.0$ ... (A), $0.5 \leq W2/L2 \leq 1.5$ ... (B), $0.3 \leq S1M/S1 \leq 0.6$ ... (C), and $0.5 \leq S2M/S2 \leq 1.0$ ... (D).

18 Claims, 4 Drawing Sheets

(52) U.S. Cl.
CPC ... *B60C 2011/0348* (2013.01); *B60C 2200/10* (2013.01); *B60C 2200/14* (2013.01)

(56) References Cited

U.S. PATENT DOCUMENTS

| | | | |
|---|---|---|---|
| 8,950,452 B2 * | 2/2015 | Matsumura | B60C 11/11 152/209.11 |
| 2005/0139301 A1 | 6/2005 | Nakamura | |
| 2010/0319826 A1 * | 12/2010 | Idei | B60C 11/11 152/209.15 |
| 2011/0308681 A1 | 12/2011 | Nakamura | |
| 2012/0024440 A1 | 2/2012 | Ishida | |
| 2012/0048436 A1 | 3/2012 | Matsumura | |
| 2012/0160381 A1 | 6/2012 | Ishida | |
| 2016/0016437 A1 | 1/2016 | Ito | |

FOREIGN PATENT DOCUMENTS

| | | | |
|---|---|---|---|
| CN | 101920637 A | 12/2010 | |
| CN | 102256811 A | 11/2011 | |
| CN | 102343770 A | 2/2012 | |
| CN | 102381141 A | 3/2012 | |
| EP | 1 792 753 A1 | 6/2007 | |
| EP | 1792753 A1 * | 6/2007 | ............ B60C 11/11 |
| EP | 2412546 A1 | 2/2012 | |
| EP | 2423006 A1 | 2/2012 | |
| JP | 61-009316 A | 1/1986 | |
| JP | 01-160710 A | 6/1989 | |
| JP | 2007-112396 A | 5/2007 | |
| JP | 2007-152973 A | 6/2007 | |
| JP | 2007-168651 A | 7/2007 | |
| JP | 2010-163144 A | 7/2010 | |
| JP | 2011-000934 A | 1/2011 | |
| JP | 2012-046078 A | 3/2012 | |
| JP | 2012136186 A | 7/2012 | |
| JP | 2014213687 A | 11/2014 | |
| JP | 2016-060228 A | 4/2016 | |
| JP | 2016-060229 A | 4/2016 | |
| JP | 2016-060230 A | 4/2016 | |
| JP | 2016-060231 A | 4/2016 | |

OTHER PUBLICATIONS

International Search Report of PCT/JP2016/003208 dated Sep. 13, 2016.

Communication dated May 30, 2018, from European Patent Office in counterpart application No. 16824047.1.

* cited by examiner (FIG. 2)    (FIG. 3)

MOTORCYCLE PNEUMATIC TIRE

CROSS REFERENCE TO RELATED APPLICATIONS

This application is a National Stage of International Application No. PCT/JP2016/003208 filed Jul. 5, 2016, claiming priority based on Japanese Patent Application No. 2015-141464 filed Jul. 15, 2015 and Japanese Patent Application No. 2016-057513 filed Mar. 22, 2016, the contents of all of which are incorporated herein by reference in their entirety.

TECHNICAL FIELD

This disclosure relates to a motorcycle pneumatic tire particularly effectively usable as a motorcycle pneumatic tire for running on rough terrain.

BACKGROUND

Conventionally, arrangement of a plurality of blocks on a tread surface is a known technique in motorcycle pneumatic tires designed to be driven on rough terrain, in particular swampy ground (for example, see JP2007-152973A (PTL1)).

CITATION LIST

Patent Literature

PTL1: JP2007-152973A

SUMMARY

Technical Problem

In the aforementioned motorcycle pneumatic tire, achievement of both traction performance and cornering gripping performance has been required.

This disclosure aims to provide a motorcycle pneumatic tire capable of achieving both the traction performance and the cornering gripping performance.

Solution to Problem

A summary of this disclosure is as follows.

The motorcycle pneumatic tire of this disclosure comprises a plurality of blocks arranged on a tread surface, wherein:

when a developed width of the tread surface is divided into six equal parts in a tire width direction, and when two regions closest to a tire equatorial plane are defined as a central region, two regions on tire widthwise outermost sides are respectively defined as shoulder regions, and two regions located between the central region and the shoulder regions are defined as intermediate regions, a plurality of wide blocks, each having a tire widthwise length larger than a tire circumferential length, are formed in at least the central region and the intermediate regions, and a plurality of narrow blocks, each having a smaller tire widthwise length than each of the wide blocks, are formed in at least the intermediate regions; and in a developed view of the tread surface, the following relations (A) to (D) are satisfied:

$$1.5 \leq W1/L1 \leq 4.0 \quad (A),$$
$$0.5 \leq W2/L2 \leq 1.5 \quad (B),$$
$$0.3 \leq S1M/S1 \leq 0.6 \quad (C), \text{ and}$$
$$0.5 \leq S2M/S2 \leq 1.0 \quad (D),$$

where L1 is the tire circumferential length of each of the wide blocks, W1 is the tire widthwise length of each of the wide blocks, L2 is a tire circumferential length of each of the narrow blocks, W2 is the tire widthwise length of each of the narrow blocks, S1 is an area of the tread surface of each of the wide blocks. S2 is an area of the tread surface of each of the narrow blocks, S1M is an area of the tread surface located in the intermediate regions within the area S1, and S2M is an area of the tread surface located in the intermediate regions within the area S2.

Here, the "tire circumferential lengths L1, L2" refer to tire circumferential projections lengths of the blocks in a developed view of the tread surface, and the "tire widthwise lengths W1, W2" refer to tire widthwise projection lengths of the blocks in a developed view of the tread surface.

As used herein, "substantially the same phase in the tire circumferential direction" means that a tire circumferential length over which each wide block and each narrow block overlap each other when projected in the tire width direction is 80% or more of the tire circumferential length L1 of each wide block or the tire circumferential length L2 of each narrow block.

As used herein, "an inclination angle of a wall surface with respect to a tire radial direction" refers to, as illustrated in FIG. 5, an inclination angle θ of a line segment connecting a tire radial outer end and a tire radial inner end of the wall surface with respect to the tire radial direction, in a tire radial region Y1 of 80% from a tire radial outer end to a tire radial inner side of a tire radial range Y from a connection point with the tread surface to a block surface.

As used herein, "a bottom" refers to a part within a tire radial region Y2 of 20% from the tire radial inner end (the connection point with the tread surface) to the tire radial outer side within the tire radial range Y from the connection point with the tread surface to the block surface.

Advantageous Effect

According to this disclosure, it is possible to provide a motorcycle pneumatic tire capable of achieving both the traction performance and the cornering gripping performance.

DETAILED DESCRIPTION

The following describes embodiments of this disclosure in detail with reference to the drawings.

Figure 1:
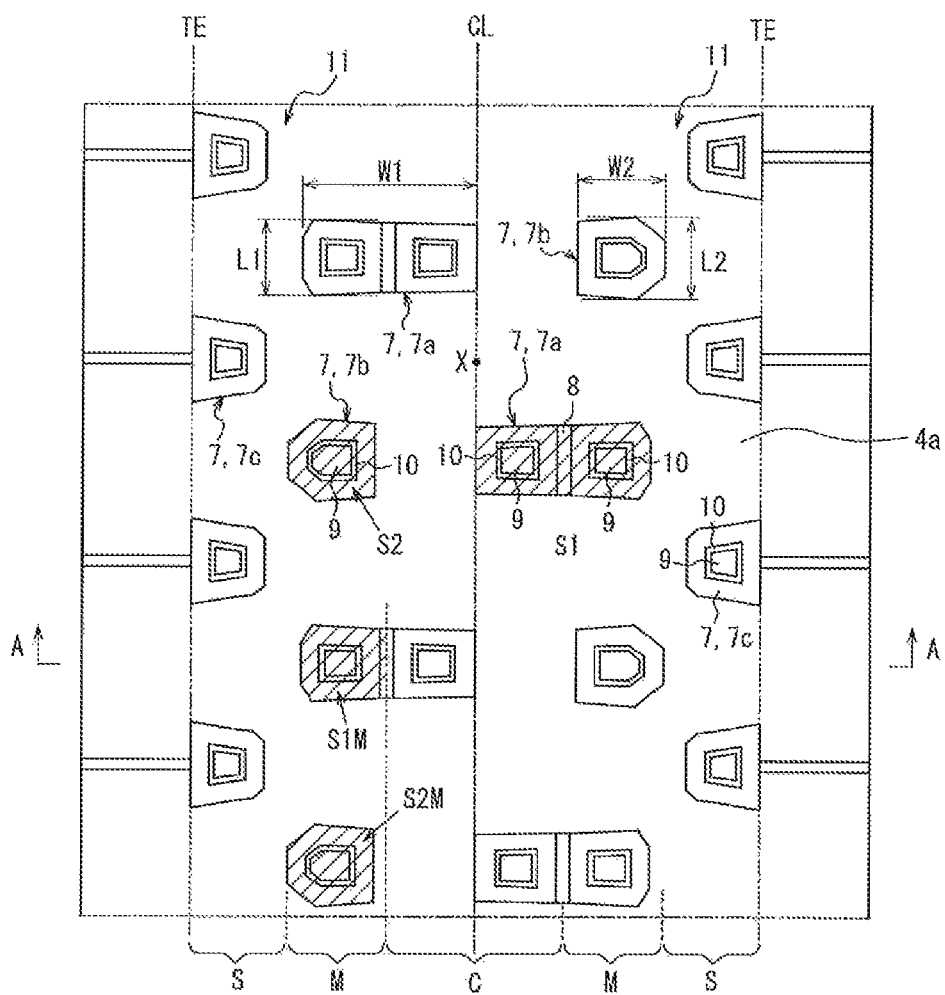
FIG. 1 is a developed view illustrating a tread pattern of a motorcycle pneumatic tire according to one embodiment of this disclosure.
Figure 2:
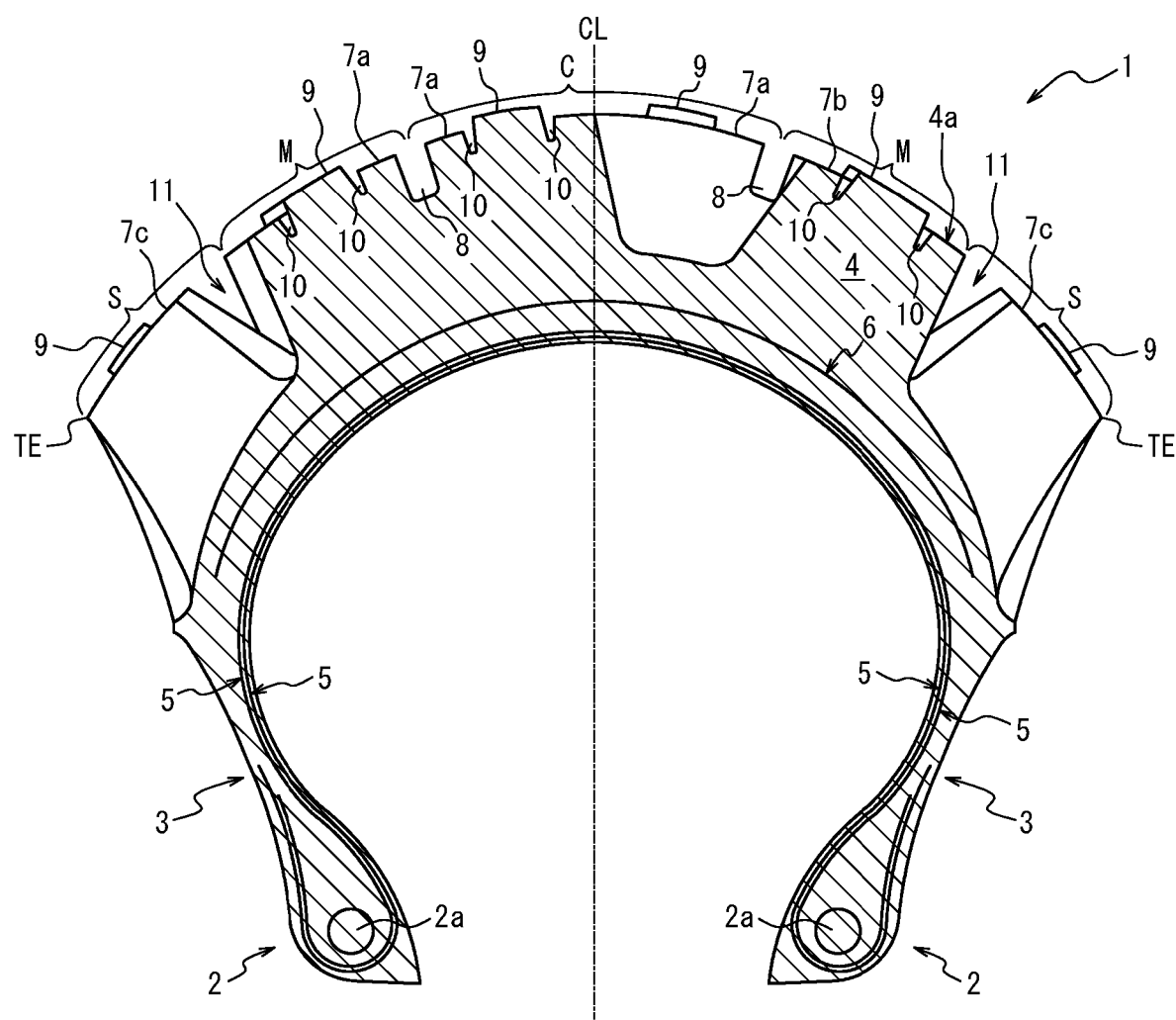
FIG. 2 is a tire widthwise schematic cross-sectional view of the motorcycle pneumatic tire according to the one embodiment of this disclosure.

FIG. 2 illustrates a tire widthwise cross-sectional view (an A-A cross-sectional view in FIG. 1) of the motorcycle pneumatic tire (hereinafter referred to as merely "the tire") according to the one embodiment of this disclosure. In this disclosure, an internal structure of the tire is not specifically limited. As an example, as illustrated in FIG. 2, this tire 1 has a pair of bead portions 2; a pair of sidewall portions 3 continuous to the bead portions 2; and a tread portion 4 toroidally continuous between the two sidewall portions 3. Moreover, this tire has: a carcass 5 composed of, in the illustrated example, two carcass plies spanning toroidally between a pair of bead cores 2a embedded in the pair of bead portions 2; and a belt 6 composed of, in the illustrated example, one belt layer, on a tire radial outer side of the carcass 5. Note that the carcass structure may be either a radial structure or a bias structure.

FIG. 1 illustrates the tread pattern of the motorcycle pneumatic tire according to the one embodiment of this disclosure.

As illustrated in FIG. 1, in this tire 1, a plurality of blocks 7 are arranged on a tread surface 4a. In the illustrated example, patterns, which are symmetrical in a developed view of the tread surface 4a with respect to a tire equatorial plane CL on one and the other tire widthwise sides of the tread surface 4a divided by the tire equatorial plane CL are arranged on tire widthwise half portions in a manner displaced from each other in the tire circumferential direction. Furthermore, two rows on each tire widthwise half portion of the tread surface 4a, and four rows in total on the entire tread surface 4a of block rows are arranged along the tire circumferential direction.

Here, as illustrated in FIGS. 1 and 2, when the developed width of the tread surface 4a (between both tread edges TE) is divided into 6 parts in the tire width direction, two regions closest to the tire equatorial plane CL are defined as a central region C, two regions on tire widthwise outermost sides are respectively defined as shoulder regions S, and two regions between the central region C and the shoulder regions S are respectively defined as intermediate regions M.

As illustrated in FIG. 1, in this tire, a plurality (one on each tread widthwise half portion and two on the entire tread surface 4a in the illustrated example) of central block rows are formed at displaced phases in the tire circumferential direction in different tire widthwise half portions, where in the central block rows, wide blocks 7a and narrow blocks 7b are lined up alternately in the tire circumferential direction, where each wide block 7a has a tire widthwise length larger than a tire circumferential length and exists in at least the central region C and the intermediate regions M, and each narrow block 7b has a smaller tire widthwise length than each wide block 7a and exists in at least the intermediate regions M. In the present embodiment, the tire widthwise length W1 of each wide block 7a is about two times of the tire widthwise length W2 of the narrow block 7b adjacent in the tire circumferential direction in the central block row. In the illustrated example, the tire widthwise inner end of each wide block 7a is located on the tire equatorial plane CL, while the tire widthwise outer end of each wide block 7a exists at substantially the same tire widthwise position as the tire widthwise outer end of each narrow block 7b. Moreover, in the illustrated example, the wide blocks 7a on one tire widthwise half portion and the narrow blocks 7b on the other half portion are located at substantially the same tire circumferential position, and the wide blocks 7a on the other half portion and the narrow blocks 7b on the one half portion are located at substantially the same tire circumferential position as well. Note that in the illustrated example, the wide blocks 7a exist in only the central region C and the intermediate regions M, but the tire widthwise outer ends of the wide blocks 7a may exist in the shoulder regions S. Moreover, the tire widthwise inner ends of the wide blocks 7a may be located on a tire widthwise side outer than the tire equatorial plane CL within the central region C, and may exist on the other tire widthwise half portion beyond the tire equatorial plane CL. Moreover, in the illustrated example, the narrow blocks 7b exist in only the intermediate regions M (i.e., all of the entire narrow blocks 7b exist in the intermediate regions M), but their tire widthwise inner ends may exist in the central region C, and their tire widthwise outer ends may exist in the shoulder regions S as well.

As illustrated in FIG. 1, in this tire 1, on each tire widthwise half portion, side blocks 7c are formed in at least the shoulder regions S (located in only the shoulder regions S in the present example), and in the illustrated example, one side block row (i.e., two on the entire tread surface 4a) composed of a plurality of the side blocks 7c arranged in the tire circumferential direction is arranged. In the present embodiment, the two side block rows have phases in accordance with each other in the tire circumferential direction. On the other hand, the central block rows and the side block rows are arranged in a manner provided with a phase difference in the tire circumferential direction, such that the wide blocks 7a or the narrow blocks 7b and the side blocks 7c do not have a part overlapping each other when projected in the tire width direction. Thereby, it is possible to ensure an edge component with respect to the circumferential direction which functions during cornering, and to ensure the cornering gripping performance.

Note that as illustrated in FIG. 1, in the present embodiment, the wide blocks 7a, the narrow blocks 7b and the side blocks 7c are arranged point-symmetrically with respect to a point X, and this point-symmetrical pattern is configured so as to be lined up repeatedly in the tire circumferential direction.

Next, the wide blocks 7a are described in detail. As illustrated in FIG. 1, each wide block 7a has a substantially rectangular shape, of which the tire widthwise length is larger than the tire circumferential length in a developed view of the tread surface 4a. Moreover, as illustrated in FIG. 1, on each wide block 7a, one recess 8 is formed at a tire widthwise center of the wide block. In the illustrated example, the recess 8 is formed as a circumferential narrow groove 8, where the circumferential narrow groove 8 extends to both tire circumferential ends of each wide block 7a. Note that the "tire widthwise center" refers to a tire widthwise central position of a one-side end and an other-side end of each wide block 7a in the tire width direction.

As illustrated in FIG. 1, in the illustrated example, respectively one protrusion 9 is formed on each side of each circumferential narrow groove 8 formed on the corresponding wide block 7a. As illustrated in FIG. 2, a part with the protrusion 9 formed thereon has a height larger than the other part of each wide block 7a. Furthermore, in a developed view of the tread surface 4a, the protrusion 9 has a wide shape, of which the tire widthwise length is larger than the tire circumferential length. Moreover, a protrusion circumferential peripheral recess 10 is formed on a circumferential periphery of the protrusion 9.

Regarding the narrow blocks 7b, as illustrated in FIG. 1, each narrow block 7b has a substantially hexagonal shape, of which the tire widthwise length is smaller than each wide block 7a in a developed view of the tread surface 4a. Furthermore, as illustrated in FIG. 1, in the illustrated example, one protrusion 9 is formed on each narrow block 7b. As illustrated in FIG. 2, a part with the protrusion 9 formed thereon has a height larger than the other part of the corresponding narrow block 7b. Furthermore, in a developed view of the tread surface 4a, each protrusion 9 has a substantially hexagonal shape substantially similar as the corresponding narrow block 7b. Moreover, a protrusion circumferential peripheral recess 10 is formed on a circumferential periphery of the protrusion 9.

Regarding the side blocks 7c, as illustrated in FIG. 1, each side block 7c has a substantially trapezoidal shape in a developed view of the tread surface 4a. Furthermore, as illustrated in FIG. 1, in the illustrated example, one protrusion 9 is formed on each side block 7c. As illustrated in FIG. 2, a part with the protrusion 9 formed thereon has a height larger than the other part of the corresponding side block 7c. Furthermore, in a developed view of the tread surface 4a, each protrusion 9 has a substantially trapezoidal shape substantially similar as the corresponding side block. Moreover, a protrusion circumferential peripheral recess 10 is formed on a circumferential periphery of the protrusion 9.

Here, as illustrated in FIG. 1, this tire 1 has a groove portion partitioning the blocks 7 formed on the tread surface 4a in a manner spanning the entire tread surface 4a. In the present embodiment, on each tire widthwise half portion divided by the tire equatorial plane CL, respectively one circumferential groove 11 (i.e., two on the entire tread surface 4a) extending continuously in the tire circumferential direction is formed in a tire widthwise space between the central block row and the side block row.

In the motorcycle pneumatic tire of the present embodiment, in a developed view of the tread surface, the following relations (A) to (D) are satisfied:

$$1.5 \leq W1/L1 \leq 4.0 \quad (A),$$

$$0.5 \leq W2/L2 \leq 1.5 \quad (B),$$

$$0.3 \leq S1M/S1 \leq 0.6 \quad (C), \text{ and}$$

$$0.5 \leq S2M/S2 \leq 1.0 \quad (D),$$

where L1 is the tire circumferential length of each wide block 7a, W1 is the tire widthwise length of each wide block 7a, L2 is the tire circumferential length of each narrow block 7b, W2 is the tire widthwise length of each narrow block 7b, S1 is the area of the tread surface of each wide block 7a (referring to an area of a part surrounded by the circumferential periphery of each wide block 7a, inclusive of the recess 8, the protrusion 9 and the protrusion circumferential peripheral recess 10), S2 is the area of the tread surface of each narrow block 7b (referring to an area of a part surrounded by the circumferential periphery of each narrow block 7b, inclusive of the protrusion 9 and the protrusion circumferential peripheral recess 10), S1M is the area of the tread surface located in the intermediate regions within the area S1, and S2M is the area of the tread surface located in the intermediate regions within the area S2.

The effect of the motorcycle pneumatic tire of the present embodiment is described in the following.

According to the motorcycle pneumatic tire of the present embodiment, first, since the wide blocks 7a satisfying the relation $1.5 \leq W1/L1 \leq 4.0$ exist in the central region C and the intermediate regions M, it is possible to ensure a large edge component with respect to the tire circumferential direction, and to improve the traction performance. Namely, if the ratio W1/L1 is less than 1.5, the edge component with respect to the tire circumferential direction is reduced, which deteriorates the traction performance. Moreover, if the ratio W1/L1 is more than 4.0, the durability of the wide blocks 7a is deteriorated. Note that even if the ratio W1/L1 is less than 1.5, it is possible to ensure the edge component with respect to the tire circumferential direction by raising both W1 and L1. However, in this case, a circumferential block rigidity is excessively raised, and the blocks cannot appropriately collapse to the tire circumferential direction, which deteriorates the traction performance. Moreover, if the ratio W1/L1 is more than 4.0, it is possible to ensure the durability by reducing both W1 and L1. However, in this case, the edge component with respect to the tire circumferential direction is reduced, which deteriorates the traction performance.

Further, since the area S1 of the tread surface of each wide block 7a and the area S1M of the tread surface located in the intermediate regions M within the area S1 satisfy the relation $0.3 \leq S1M/S1 \leq 0.6$, it is possible to improve the traction performance both during cornering and during straight running. Namely, if the ratio S1M/S1 is less than 0.3, the traction performance during cornering is deteriorated. Moreover, if the ratio S1M/S1 is more than 0.6, since the part where the wide blocks 7a exist in the central region C is reduced, there are cases where a traction in a straight running direction cannot be sufficiently exhibited.

Here, in the motorcycle pneumatic tire, since the vehicle body to which the tire is mounted is inclined during cornering, the edge component in the intermediate regions M contributes at a high degree.

In the present embodiment, since the narrow blocks 7b satisfying the relation $0.5 \leq W2/L2 \leq 1.5$ exist in at least the intermediate regions M, it is possible to ensure the cornering gripping performance. Since existence of a region without existence of blocks (clearance) on both tire widthwise sides of the blocks existing in the intermediate regions M (the narrow blocks 7b in the present embodiment) is effective for improving the cornering gripping performance, a block which is not wide in terms of aspect ratio is necessarily disposed in the intermediate regions M. If the ratio W2/L2 is more than 1.5, the aforementioned clearance cannot be ensured. In addition, the widthwise block rigidity is excessively raised and the blocks cannot appropriately collapse to the tire width direction, which deteriorates the cornering gripping performance. On the other hand, if the ratio W2/L2 is less than 0.5, since the edge component with respect to the tire circumferential direction is reduced, the traction performance in the longitudinal direction is deteriorated. Note that even if the ratio W2/L2 is more than 1.5, the tire widthwise block rigidity is not excessively raised if both W2 and L2 are reduced. However, in this case, the edge component with respect to the tire circumferential direction is reduced, which deteriorates the traction performance. On the other hand, even if the ratio W2/L2 is less than 0.5, it is possible to ensure the edge component with respect to the tire circumferential direction and to ensure the traction performance by raising both W2 and L2. However, in this case, the tire circumferential block rigidity is excessively raised, and the blocks cannot appropriately collapse to the tire circumferential direction, which deteriorates the traction performance.

Furthermore, since the area S2 of the tread surface of each narrow block 7b and the area S2M of the tread surface of the part of each narrow block 7b existing in the intermediate regions M satisfy the relation $0.5 \leq S2M/S2 \leq 1.0$, it is possible to ensure the gripping performance at a medium camber angle. Namely, if the ratio S2M/S2 is less than 0.5, the intermediate regions M, which are used at a medium camber angle, have a smaller footprint area for efficiently exhibiting the gripping performance as compared to the narrow blocks 7b, which deteriorates the gripping performance at a medium camber angle.

As mentioned above, according to the motorcycle pneumatic tire of the present embodiment, it is possible to achieve both the traction performance and the cornering gripping performance.

Here, when N1 is the number of wide blocks 7a existing in the intermediate regions M and N2 is the number of narrow blocks 7b existing in the intermediate regions M, it is preferable that a relation $0.25 \leq N2/N1 \leq 4.0$ is satisfied. If the ratio N2/N1 is less than 0.25, since the number of narrow blocks 7b existing in the intermediate regions M is small, the cornering gripping performance is deteriorated. If the ratio N2/N1 is more than 4.0, since the number of wide blocks 7a existing in the intermediate regions M is small, the traction performance is deteriorated. Further more preferably, it is preferable that $0.30 \leq N2/N1 \leq 3.0$ is satisfied. By setting the ratio of N2 and N1 in this way, it is possible to maintain excellent balance of the cornering gripping performance and the traction performance.

In the motorcycle pneumatic tire of this disclosure, as illustrated in FIG. 1, it is preferable that the wide blocks 7a and the narrow blocks 7b are disposed in pairs (respectively one) at positions at substantially the same phase in the tire circumferential direction, and the wide blocks 7a and the narrow blocks 7b located in substantially the same phase in the tire circumferential direction are located on different tire widthwise half portions divided by the tire equatorial plane CL. By providing a narrow block 7b as one of the blocks located in substantially the same tire circumferential phase, it is possible to further ensure the cornering gripping performance by disposing the aforementioned clearance (in the embodiment as illustrated in FIG. 1, a tire widthwise length of the clearance existing between the wide block 7a and the narrow block 7b in a pair is substantially the same as the tire widthwise length W2 of the narrow block 7b) on both tire widthwise sides of the blocks existing in the intermediate regions M. On the other hand, by providing the wide block 7a as the other block located in substantially the same tire circumferential phase, it is possible to ensure the edge component with respect to the tire circumferential direction and to further ensure the traction performance. Therefore, it is possible to further achieve both the traction performance and the cornering gripping performance. Furthermore, in order to balance the rigidity and the edge component of both tire widthwise half portions symmetrical with respect to the tire equatorial plane CL, as illustrated in FIG. 1, it is preferable that regarding one tire widthwise half portion, pairs of wide blocks 7a and narrow blocks 7b adjacent in the tire circumferential direction are arranged such that the wide blocks 7a and the narrow blocks 7b are located alternately in the tire circumferential direction.

In the motorcycle pneumatic tire of this disclosure, it is preferable that a recess 8 is disposed on each wide block 7a. This is because that it is possible to buffer the rigidity of each wide block 7a and to further achieve the cornering gripping performance. Furthermore, in the motorcycle pneumatic tire of this disclosure, it is preferable that according to the present embodiment, the recess 8 is a circumferential narrow groove 8 extending in the tire circumferential direction. This is because that it is possible to further ensure the edge component with respect to the tire width direction, and to further ensure the cornering gripping performance. Note that in order to ensure the edge component with respect to the tire circumferential direction and to further improve the traction performance, a narrow width-direction groove extending in the tire width direction may be disposed on each wide block 7a as the recess plurality of recesses 8 may be disposed as well.

Here, in the motorcycle pneumatic tire of this disclosure, it is preferable that according to the present embodiment, a protrusion 9 is formed on both tire widthwise sides of the recess 8 of each wide block 7a. This is because that it is possible to further ensure the edge component with respect to the tire circumferential direction, and to further improve the traction performance. Moreover, it is possible to further ensure the edge component with respect to the tire width direction, and to ensure the cornering gripping performance. In the present embodiment, the protrusion 9 is disposed on both sides of the recess 8, but the protrusion 9 may be disposed on only one side as well. Note that it is preferable that according to the present embodiment, a protrusion 9 is disposed on each narrow block 7b and on each side block 7c as well, and it is preferable that a protrusion circumferential peripheral recess 10 is disposed on the circumferential periphery of each protrusion 9.

Here, the "tire circumferential length of the protrusion" refers to a length of a part with a maximum length when dimensions of the protrusion are measured along the tire circumferential direction in a developed view of the tread surface, and the "tire widthwise length of the protrusion" refers to a length of a part with a maximum length when dimensions of the protrusion are measured along the tire width direction in a developed view of the tread surface.

In the motorcycle pneumatic tire of this disclosure, it is preferable that according to the present embodiment, the recess 8 is the circumferential narrow groove 8, and a depth/block height of the circumferential narrow groove 8 is 0.6 or less, more preferably 0.35 or less. This is because that it is possible to suppress occurrence of cracking from a groove bottom of the circumferential narrow groove 8 and to ensure the durability of the wide blocks 7a.

Figure 3:
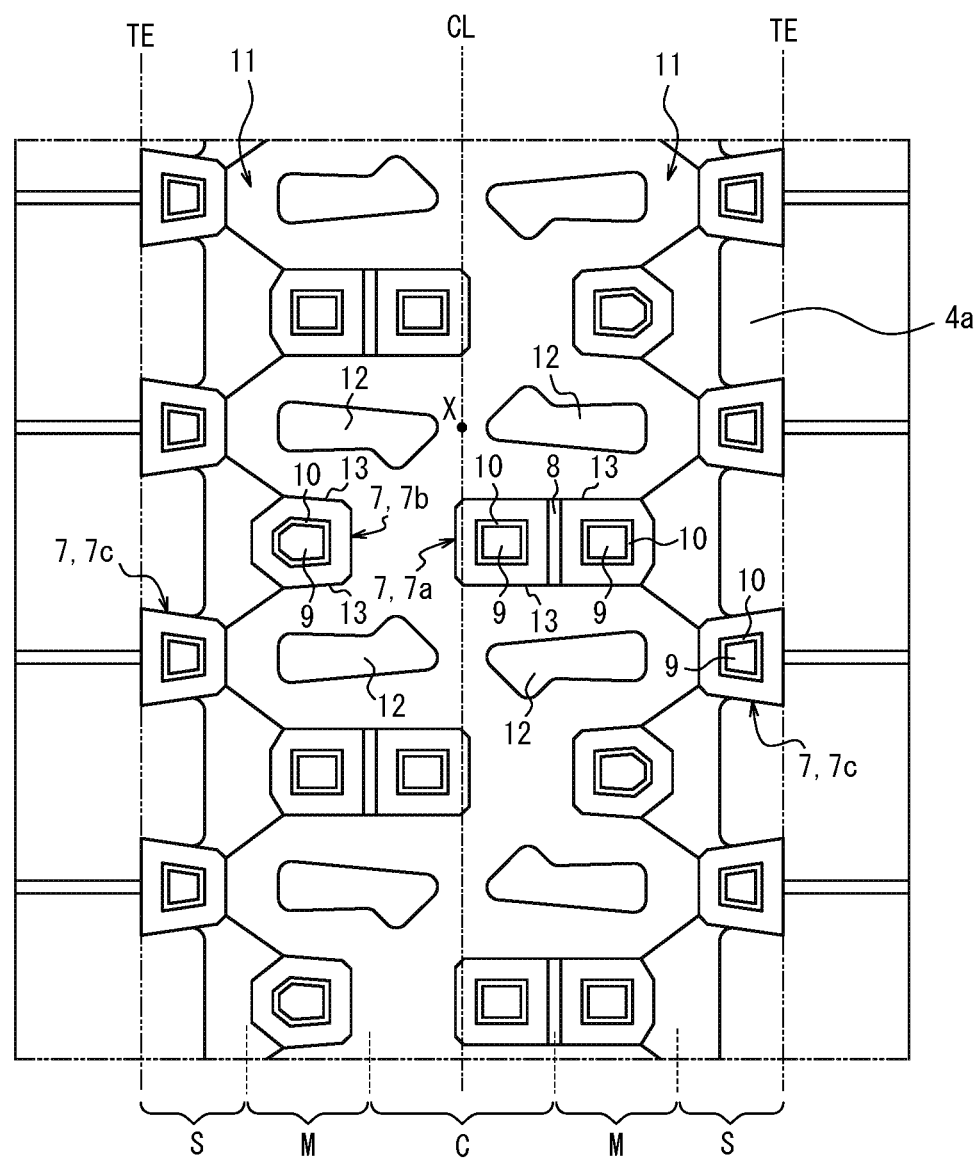
FIG. 3 is a partially developed view illustrating a part of a tread pattern of a motorcycle pneumatic tire according to another embodiment of this disclosure.

FIG. 3 illustrates a partially developed view illustrating a part of a tread pattern of a motorcycle pneumatic tire according to another embodiment of this disclosure.

The embodiment as illustrated in FIG. 3 is different form the tread pattern as illustrated in FIG. 1 in that the wide blocks 7a exist in the central region C and the intermediate regions M on one tire widthwise half portion centering on the tire equatorial plane CL, and exist in the central region C on the other tire widthwise half portion in a manner across the tire equatorial plane CL.

Moreover, the tire of the embodiment as illustrated in FIG. 3 is different from the tread pattern as illustrated in FIG. 1 in that it has a plurality of recesses 12 existing in the central region C and the intermediate regions M in the tire width direction and existing in spaces between the wide blocks 7a and the narrow blocks 7b in the tire circumferential direction.

As illustrated in FIG. 3, a side of each recess 12 adjacent to a wide block 7a is inclined with respect to the tire width direction so as to be spaced in the tire circumferential direction from the wide block 7a toward the tire widthwise inner side. Moreover, each recess 12 has a shape provided with, on a tire widthwise side inner than its tire widthwise central position, a protruding portion with a substantially triangular shape in a planar view, which protrudes in the tire circumferential direction to the narrow block 7b side.

Figure 4A:
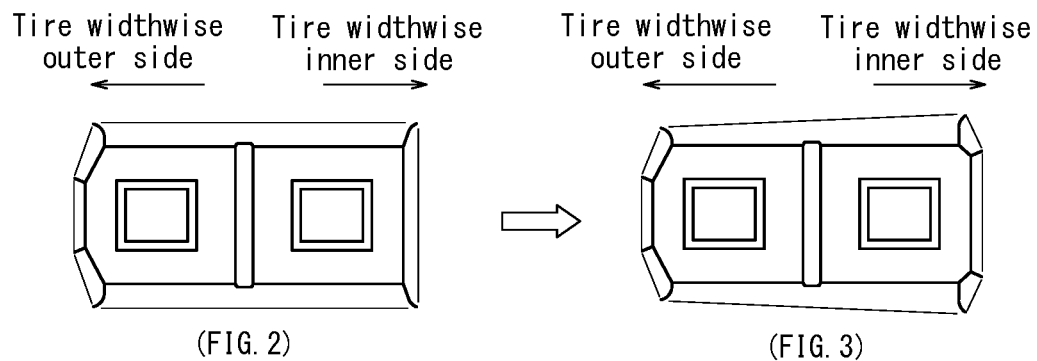
FIG. 4A is a plan view illustrating comparison of a wide block in the tread pattern of FIG. 1 and a wide block in the tread pattern of FIG. 3.
Figure 4B:
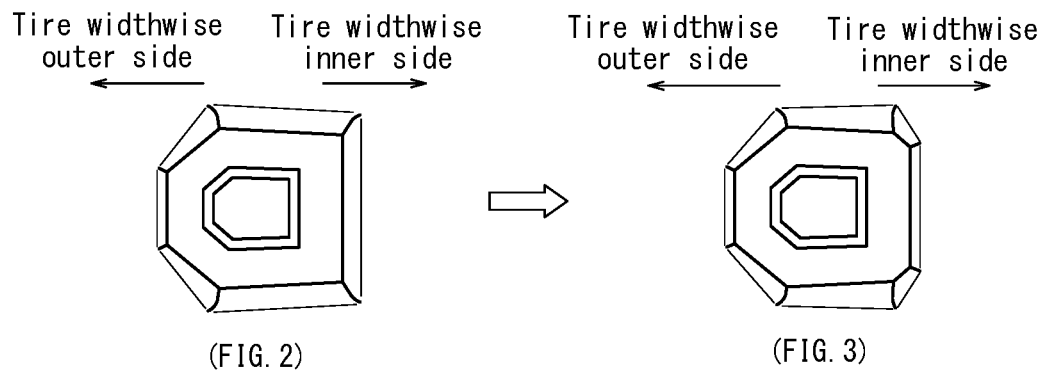
FIG. 4B is a plan view illustrating comparison of a narrow block in the tread pattern of FIG. 1 and a narrow block in the tread pattern of FIG. 3.
Figure 5:
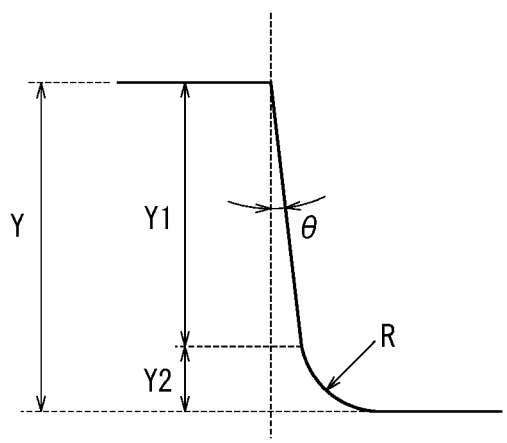
FIG. 5 illustrates an inclination angle of a wall surface of a block and a radius of curvature of a bottom of the block.

FIG. 4A is a plan view illustrating comparison of a wide block in the tread pattern of FIG. 1 and a wide block in the tread pattern of FIG. 3. FIG. 4B is a plan view illustrating comparison of a narrow block in the tread pattern of FIG. 1 and a narrow block in the tread pattern of FIG. 3.

As illustrated in FIGS. 3, 4A and 4B, in the embodiment as illustrated in FIG. 3, on the tire widthwise half portions divided by the tire equatorial plane CL on which the wide blocks 7a exist in at least the central region C and the intermediate regions M, an inclination angle with respect to the tire radial direction of wall surfaces on both tire circumferential sides (wall surfaces extending in the tire width direction) of each wide block 7a increases toward the tire widthwise inner side.

Moreover, in the embodiment as illustrated in FIG. 3, in a tire circumferential cross section, a bottom of the wall surfaces on both tire circumferential sides of each wide block 7a has a curvature, and on the tire widthwise half portions divided by the tire equatorial plane CL on which the wide blocks 7a exist in at least the central region C and the intermediate regions M, a radius of curvature R of the bottom increases toward the tire widthwise inner side.

Further, as illustrated in FIGS. 3, 4A and 4B, in the embodiment as illustrated in FIG. 3, an inclination angle with respect to the tire radial direction of wall surfaces on both tire circumferential sides (wall surfaces extending in the tire width direction) of each narrow block 7b increases toward the tire widthwise inner side. Moreover, in a tire circumferential cross section, a bottom of the wall surfaces on both tire circumferential sides of each narrow block 7b has a curvature, where the radius of curvature R of the bottom increases toward the tire widthwise inner side.

According to the embodiment as illustrated in FIG. 3, it is possible to ensure the rigidity of the wide blocks 7a and the narrow blocks 7b on a tire equatorial plane side, where an input of force from the road surface is large, and to further improve the durability of the blocks.

From such viewpoint, in this disclosure, it is preferable that on the tire widthwise half portions divided by the tire equatorial plane CL on which the wide blocks 7a exist in at least the central region C and the intermediate regions M, an inclination angle with respect to the tire radial direction of at least one wall surface of each wide block 7a in the tire circumferential direction increases toward the tire widthwise inner side.

In this case, for example, it is preferable that the inclination angle of the wall surface in the tire circumferential direction of each wide block 7a is different by 5° to 25° at a tire widthwise outer end and at a tire widthwise inner end on the tire widthwise half portions.

Moreover, in this disclosure, it is preferable that in a tire circumferential cross section, a bottom of at least one of the wall surfaces on tire circumferential sides of each wide block 7a has a curvature, and on the tire widthwise half portions divided by the tire equatorial plane CL on which the wide blocks 7a exist in at least the central region C and the intermediate regions M, a radius of curvature R of the bottom increases toward the tire widthwise inner side.

In this case, for example, it is preferable that the radius of curvature R of the wall surface on the tire circumferential side of the wide block 7a is different by 1 mm to 7 mm at a tire widthwise outer end and at a tire widthwise inner end on the tire widthwise half portions.

From the same viewpoint as mentioned above, in this disclosure, it is preferable that an inclination angle with respect to the tire radial direction of at least one of the wall surfaces on tire circumferential sides of each narrow block 7b increases toward the tire widthwise inner side.

In this case, for example, it is preferable that the inclination angle of the wall surface on the tire circumferential side of the narrow block 7b is different by 5° to 20° at a tire widthwise outer end and at a tire widthwise inner end.

Moreover, in this disclosure, it is preferable that in a tire circumferential cross section, a bottom of at least one of the wall surfaces on tire circumferential sides of each narrow block 7b has a curvature, where a radius of curvature R of the bottom increases toward the tire widthwise inner side.

In this case, for example, it is preferable that the radius of curvature R of the wall surface on the tire circumferential side of the narrow block 7b is different by 1 mm to 5 mm at a tire widthwise outer end and at a tire widthwise inner end.

EXAMPLES

Example 1

In order to certify the effect of this disclosure, tires according to Examples 1 to 11 and tires according to Comparative Examples 1 to 5 were manufactured experimentally, and tests for evaluating the performances of the tires were performed. The dimensions of each aforementioned tire are as indicated in the following Table 1. Each tire, as illustrated in FIGS. 1 and 2, has a plurality of blocks 7 arranged on the tread surface 4a, and dimensions not indicated in Table 1 are in common as for each tire.

<Traction Performance>

The traction performance after a vehicle with each aforementioned tire mounted ran on a test course on rough terrain was evaluated via sensory assessment by a rider. The evaluation result was indexed based on comparative evaluation with Comparative Example 1 as 100, where a larger value indicates excellent traction performance.

<Cornering Gripping Performance>

The cornering gripping performance after a vehicle with each aforementioned tire mounted ran on a test course on rough terrain was evaluated via sensory assessment by a rider. The evaluation result was indexed based on comparative evaluation with Comparative Example 1 as 100, where a larger value indicates excellent cornering gripping performance.

These evaluation results are as indicated in the following Table 1 together with the dimensions of the tires.

TABLE 1

|  | Comparative Example 1 | Example 1 | Example 2 | Example 3 | Comparative Example 2 | Comparative Example 3 | Example 4 | Example 5 |
|---|---|---|---|---|---|---|---|---|
| L1 (mm) | 22 | 22 | 22 | 22 | 22 | 22 | 22 | 22 |
| W1 (mm) | 44 | 44 | 44 | 44 | 44 | 44 | 44 | 44 |
| L2 (mm) | 23 | 23 | 23 | 23 | 23 | 23 | 23 | 23 |
| W2 (mm) | 23 | 23 | 23 | 23 | 23 | 23 | 23 | 23 |
| Ratio W1/L1 | 2.0 | 2.0 | 2.0 | 2.0 | 2.0 | 2.0 | 2.0 | 2.0 |

TABLE 1-continued

|  | | | | | | | | |
|---|---|---|---|---|---|---|---|---|
| Ratio W2/L2 | 1.0 | 1.0 | 1.0 | 1.0 | 1.0 | 1.0 | 1.0 | 1.0 |
| Ratio S1M/S1 | 0.25 | 0.3 | 0.45 | 0.6 | 0.7 | 0.45 | 0.45 | 0.45 |
| Ratio S2M/S2 | 0.75 | 0.75 | 0.75 | 0.75 | 0.75 | 0.45 | 0.5 | 1.0 |
| Ratio N2/N1 | 1 | 1 | 1 | 1 | 1 | 1 | 1 | 1 |
| Traction performance | 100 | 114 | 125 | 114 | 105 | 116 | 116 | 123 |
| Cornering gripping performance | 100 | 111 | 113 | 115 | 112 | 101 | 104 | 122 |

|  | Example 6 | Example 7 | Example 8 | Example 9 | Comparative Example 4 | Example 10 | Example 11 | Comparative Example 5 |
|---|---|---|---|---|---|---|---|---|
| L1 (mm) | 22 | 22 | 22 | 22 | 22 | 22 | 22 | 22 |
| W1 (mm) | 44 | 44 | 44 | 44 | 44 | 44 | 44 | 44 |
| L2 (mm) | 23 | 23 | 23 | 23 | 44 | 36 | 13 | 22 |
| W2 (mm) | 23 | 23 | 23 | 23 | 18 | 18 | 20 | 44 |
| Ratio W1/L1 | 2.0 | 2.0 | 2.0 | 2.0 | 2.0 | 2.0 | 2.0 | 2.0 |
| Ratio W2/L2 | 1.0 | 1.0 | 1.0 | 1.0 | 0.4 | 0.5 | 1.5 | 2.0 |
| Ratio S1M/S1 | 0.45 | 0.45 | 0.45 | 0.45 | 0.45 | 0.45 | 0.45 | 0.45 |
| Ratio S2M/S2 | 0.75 | 0.75 | 0.75 | 0.75 | 0.75 | 0.75 | 0.75 | 0.75 |
| Ratio N2/N1 | 0.20 | 0.25 | 4.0 | 5.0 | 1 | 1 | 1 | 1 |
| Traction performance | 132 | 127 | 108 | 104 | 113 | 116 | 123 | 125 |
| Cornering gripping performance | 98 | 106 | 126 | 129 | 101 | 107 | 105 | 90 |

As indicated in Table 1, it is understood that as compared to the tires according to Comparative Examples 1 to 5, each tire according to Examples 1 to 11 is capable of achieving both the traction performance and the cornering gripping performance.

Example 2

Next, regarding the block durability, cracks occurring to the blocks were evaluated.

The method for evaluating block breakoff is as follows, and the dimensions of each tire is as indicated in the following Table 2. Note that in Examples 12 to 16, dimensions not indicated in Table 2 are the same as Example 1.

<Cracks Occurring to Blocks>

The total number of cracks occurred in wide blocks and narrow blocks of each tire after a vehicle with each tire mounted ran on a test course on rough terrain was evaluated. The evaluation result indicates high durability of the blocks with a smaller total number of the cracks.

TABLE 2

| Tread pattern | Drawing | Example 1 | Example 12 | Example 13 | Example 14 | Example 15 | Example 16 |
|---|---|---|---|---|---|---|---|
|  |  | FIG. 2 | FIG. 3 | FIG. 3 | FIG. 3 | FIG. 3 | FIG. 3 |
| Wide block 7a | Inclination angle with respect to tire radial direction on widthwise outer end (°) | 5 | 5 | 5 | 5 | 5 | 5 |
|  | Inclination angle with respect to tire radial direction on widthwise inner end (°) | 5 | 20 | 5 | 5 | 5 | 20 |
|  | Radius of curvature or bottom on widthwise outer end (mm) | 5 | 5 | 5 | 5 | 5 | 5 |
|  | Radius or curvature of bottom on widthwise inner end (mm) | 5 | 5 | 9 | 5 | 5 | 9 |
| Narrow block 7b | Inclination angle with respect to tire radial direction on widthwise outer end (°) | 5 | 5 | 5 | 5 | 5 | 5 |
|  | Inclination angle with respect to tire radial direction on widthwise inner end (°) | 5 | 5 | 5 | 15 | 5 | 15 |
|  | Radius or curvature of bottom on widthwise outer end (mm) | 5 | 5 | 5 | 5 | 5 | 5 |
|  | Radius of curvature or bottom on widthwise inner end (mm) | 5 | 5 | 5 | 5 | 8 | 8 |
|  | Traction performance | 100 | 95 | 100 | 100 | 100 | 90 |
|  | Cornering gripping performance | 100 | 100 | 105 | 100 | 105 | 110 |
|  | Number or cracks occurring to blocks | 19 | 6 | 8 | 12 | 15 | 0 |

As indicated in Table 2, it is understood that as compared to Example 1, each one of Example 12 to Example 16 has a smaller total number of cracks occurring in blocks, and has higher durability of the blocks. Furthermore, it is understood that as compared to Comparative Example 1, each one of Example 12 to Example 16 is capable of exhibiting more excellent traction performance and cornering gripping performance.

Note that the evaluation result of Example 1 also indicates a durability of the blocks without problems for provision to the market.

Moreover, the evaluation result in Table 2 indicates a relative value with Example 1 as 100. For convenience's sake, the traction performance and the cornering gripping performance in Table 2 are obtained by converting the values in Table 1 to 100.

INDUSTRIAL APPLICABILITY

The motorcycle pneumatic tire of this disclosure is particularly effectively used as a motorcycle pneumatic tire for running on rough terrain.

REFERENCE SIGNS LIST 1 tire
2 bead portion
2a bead core
3 sidewall portion
4 tread portion
4a tread surface
5 carcass
6 belt
7 block
7a wide block
7b narrow block
7c side block
8 circumferential narrow groove recess
9 protrusion
10 protrusion circumferential peripheral recess
11 circumferential groove
12 recess
13 wall surface
CL tire equatorial plain
TE tread edge
C central region
M intermediate region
S shoulder region

The invention claimed is:

1. A motorcycle pneumatic tire comprising a plurality of blocks arranged on a tread surface, wherein:

when a developed width of the tread surface is divided into six equal parts in a tire width direction, and when two regions closest to a tire equatorial plane are defined as a central region, two regions on tire widthwise outermost sides are respectively defined as shoulder regions, and two regions located between the central region and the shoulder regions are defined as intermediate regions, a plurality of wide blocks, each having a tire widthwise length larger than a tire circumferential length, formed in at least the central region and the intermediate regions, and a plurality of narrow blocks, each having a smaller tire widthwise length than each of the wide blocks, formed in at least the intermediate regions; and in a developed view of the tread surface, the following relations (A) to (D) are satisfied:

$$1.5 \leq W1/L1 \leq 4.0 \quad (A),$$

$$0.5 \leq W2/L2 \leq 1.5 \quad (B),$$

$$0.3 \leq S1M/S1 \leq 0.6 \quad (C), \text{ and}$$

$$0.5 \leq S2M/S2 \leq 1.0 \quad (D),$$

where L1 is the tire circumferential length of each of the wide blocks, W1 is the tire widthwise length of each of the wide blocks, L2 is a tire circumferential length of each of the narrow blocks, W2 is the tire widthwise length of each of the narrow blocks, S1 is an area of the tread surface of each of the wide blocks, S2 is an area of the tread surface of each of the narrow blocks, S1M is an area of the tread surface located in the intermediate regions within the area S1, and S2M is an area of the tread surface located in the intermediate regions within the area S2, wherein only one pair including one of the wide blocks and one of the narrow blocks is disposed at positions in substantially the same phase in a tire circumferential direction, and the one pair located in substantially the same phase in the tire circumferential direction is disposed such that the one of the wide blocks and the one of the narrow blocks of the one pair are on different tire widthwise half portions divided by the tire equatorial plane.

2. The motorcycle pneumatic tire according to claim 1, wherein:

when N1 is the number of the wide blocks existing in the intermediate regions and N2 is the number of the narrow blocks existing in the intermediate regions, a relation $0.25 \leq N2/N1 \leq 4.0$ is satisfied.

3. The motorcycle pneumatic tire according to claim 2, wherein:

on tire widthwise half portions divided by the tire equatorial plane on which the wide blocks exist in at least the central region and the intermediate regions, an inclination angle with respect to a tire radial direction of at least one of wall surfaces on tire circumferential sides of each of the wide blocks increases toward a tire widthwise inner side.

4. The motorcycle pneumatic tire according to claim 2, wherein:

in a tire circumferential cross section, a bottom of at least one of wall surfaces on tire circumferential sides of each of the wide blocks has a curvature, and on tire widthwise half portions divided by the tire equatorial plane on which the wide blocks exist in at least the central region and the intermediate regions, a radius of curvature of the bottom increases toward a tire widthwise inner side.

5. The motorcycle pneumatic tire according to claim 2, wherein:

an inclination angle with respect to a tire radial direction of at least one of wall surfaces on one tire circumferential sides of each of the narrow blocks increases toward a tire widthwise inner side.

6. The motorcycle pneumatic tire according to claim 2, wherein:

in a tire circumferential cross section, a bottom of at least one of wall surfaces on tire circumferential sides of each of the narrow blocks has a curvature, and a radius of curvature of the bottom increases toward a tire widthwise inner side.

7. The motorcycle pneumatic tire according to claim 1, wherein:

on tire widthwise half portions divided by the tire equatorial plane on which the wide blocks exist in at least the central region and the intermediate regions, an inclination angle with respect to a tire radial direction of at least one of wall surfaces on tire circumferential sides of each of the wide blocks increases toward a tire widthwise inner side.

8. The motorcycle pneumatic tire according to claim 7, wherein:

in a tire circumferential cross section, a bottom of at least one of wall surfaces on tire circumferential sides of each of the wide blocks has a curvature, and on tire widthwise half portions divided by the tire equatorial plane on which the wide blocks exist in at least the central region and the intermediate regions, a radius of curvature of the bottom increases toward a tire widthwise inner side.

9. The motorcycle pneumatic tire according to claim 7, wherein:
an inclination angle with respect to a tire radial direction of at least one of wall surfaces on one tire circumferential sides of each of the narrow blocks increases toward a tire widthwise inner side.

10. The motorcycle pneumatic tire according to claim 7, wherein:
in a tire circumferential cross section, a bottom of at least one of wall surfaces on tire circumferential sides of each of the narrow blocks has a curvature, and
a radius of curvature of the bottom increases toward a tire widthwise inner side.

11. The motorcycle pneumatic tire according to claim 1, wherein:
in a tire circumferential cross section, a bottom of at least one of wall surfaces on tire circumferential sides of each of the wide blocks has a curvature, and
on tire widthwise half portions divided by the tire equatorial plane on which the wide blocks exist in at least the central region and the intermediate regions, a radius of curvature of the bottom increases toward a tire widthwise inner side.

12. The motorcycle pneumatic tire according to claim 11, wherein:
an inclination angle with respect to a tire radial direction of at least one of wall surfaces on one tire circumferential sides of each of the narrow blocks increases toward a tire widthwise inner side.

13. The motorcycle pneumatic tire according to claim 1, wherein:
an inclination angle with respect to a tire radial direction of at least one of wall surfaces on one tire circumferential sides of each of the narrow blocks increases toward a tire widthwise inner side.

14. The motorcycle pneumatic tire according to claim 1, wherein:
in a tire circumferential cross section, a bottom of at least one of wall surfaces on tire circumferential sides of each of the narrow blocks has a curvature, and
a radius of curvature of the bottom increases toward a tire widthwise inner side.

15. The motorcycle pneumatic tire according to claim 1, wherein:
on tire widthwise half portions divided by the tire equatorial plane on which the wide blocks exist in at least the central region and the intermediate regions, an inclination angle with respect to a tire radial direction of at least one of wall surfaces on tire circumferential sides of each of the wide blocks increases toward a tire widthwise inner side.

16. The motorcycle pneumatic tire according to claim 1, wherein:
in a tire circumferential cross section, a bottom of at least one of wall surfaces on tire circumferential sides of each of the wide blocks has a curvature, and
on tire widthwise half portions divided by the tire equatorial plane on which the wide blocks exist in at least the central region and the intermediate regions, a radius of curvature of the bottom increases toward a tire widthwise inner side.

17. The motorcycle pneumatic tire according to claim 1, wherein:
an inclination angle with respect to a tire radial direction of at least one of wall surfaces on one tire circumferential sides of each of the narrow blocks increases toward a tire widthwise inner side.

18. The motorcycle pneumatic tire according to claim 1, wherein:
in a tire circumferential cross section, a bottom of at least one of wall surfaces on tire circumferential sides of each of the narrow blocks has a curvature, and
a radius of curvature of the bottom increases toward a tire widthwise inner side.

* * * * *